United States Patent [19]

Schmotzer

[11] Patent Number: 4,625,593

[45] Date of Patent: Dec. 2, 1986

[54] WOOD DRILL AND METHOD OF CONSTRUCTION

[76] Inventor: Norman H. Schmotzer, 637 Shore Rd., North Palm Beach, Fla. 33408

[21] Appl. No.: 638,836

[22] Filed: Aug. 7, 1984

[51] Int. Cl.[4] ............ B23B 27/18

[52] U.S. Cl. ............ 76/108 T; 408/211; 408/214

[58] Field of Search ............ 76/108 R, 108 T; 408/211, 214, 228, 231, 144, 145, 201, 212, 213, 227, 230

[56] References Cited

U.S. PATENT DOCUMENTS

| | | | |
|---|---|---|---|
| Re. 19,182 | 5/1934 | Emmons | 408/144 |
| Re. 28,900 | 7/1976 | Byers | 408/214 |
| 285,440 | 9/1883 | Swan | 408/214 |
| 1,556,655 | 10/1925 | Whitney | 76/108 T |
| 4,222,690 | 9/1980 | Hosoi | 408/144 |

FOREIGN PATENT DOCUMENTS

| | | | |
|---|---|---|---|
| 981543 | 5/1951 | France | 408/211 |
| 66805 | 4/1982 | Japan | 408/144 |
| 84/00910 | 3/1984 | PCT Int'l Appl. | 408/230 |

*Primary Examiner*—Gil Weidenfeld
*Assistant Examiner*—Daniel W. Howell
*Attorney, Agent, or Firm*—Jack N. McCarthy

[57] ABSTRACT

A wood drill and method for its manufacture are disclosed. A drill body has an axial web with spiral lands and a holding shank. The top of the web has an axial hole receiving a projection from a separate lead screw and the top of each spiral land has a recess receiving a carbide insert for cutting. The lead screw and carbide cutting inserts are fixed to the drill body and the inserts and lands are ground to provide the proper hole sizing tips and cutting surfaces. The elements are fixed so that they can be removed for repair; they are shown as being brazed. The spiral lands can be contoured to have a spiral groove located in one or more spiral surfaces inwardly from the outer end.

7 Claims, 14 Drawing Figures

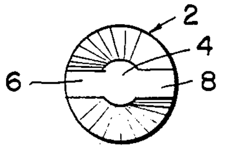
FIG. 2
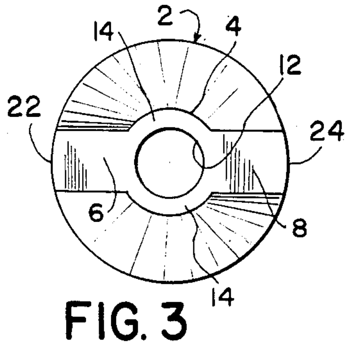
FIG. 3
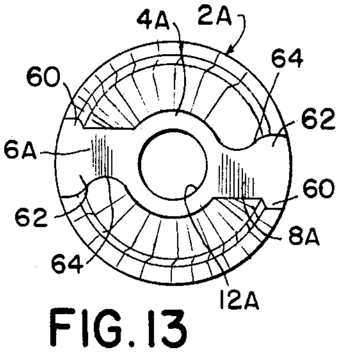
FIG. 13
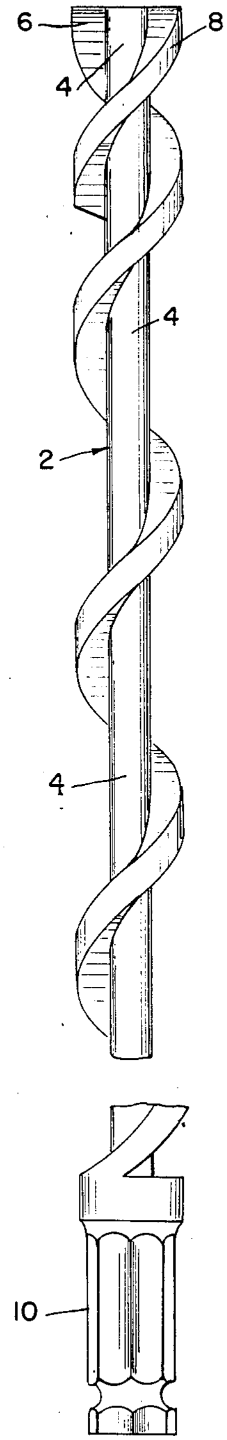
FIG. 1
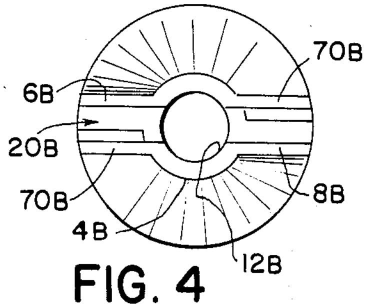
FIG. 4
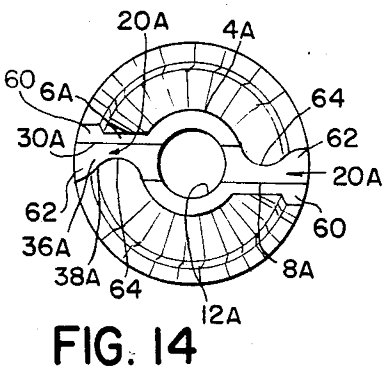
FIG. 14
FIG. 7
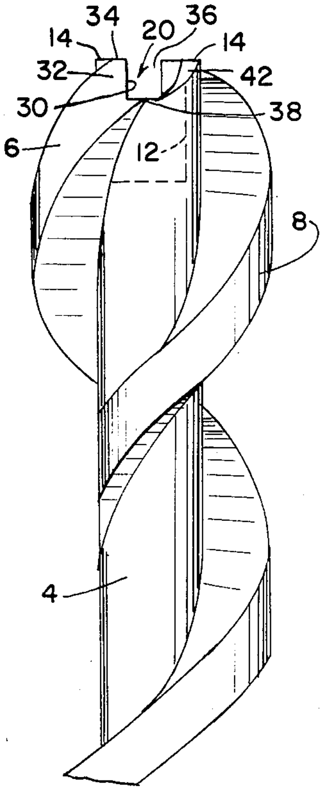
FIG. 5
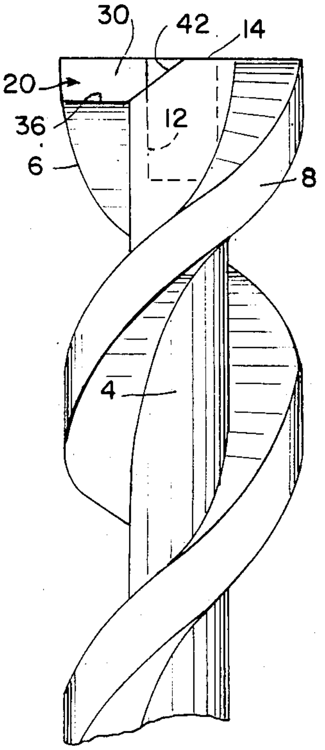

FIG. 8
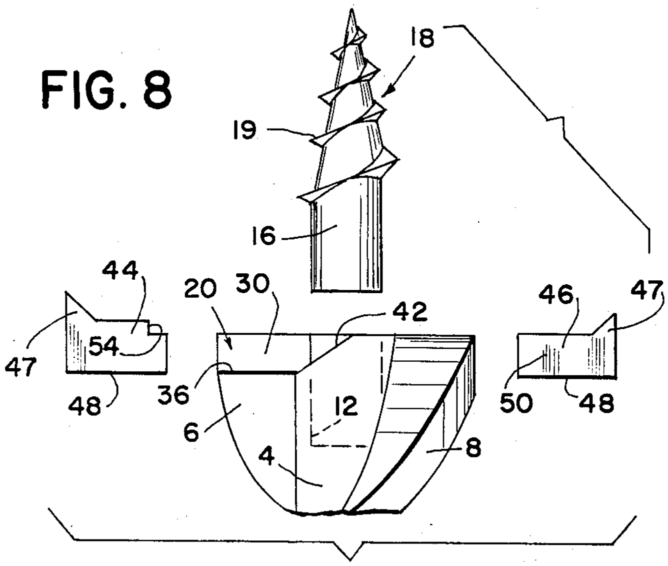
FIG. 9
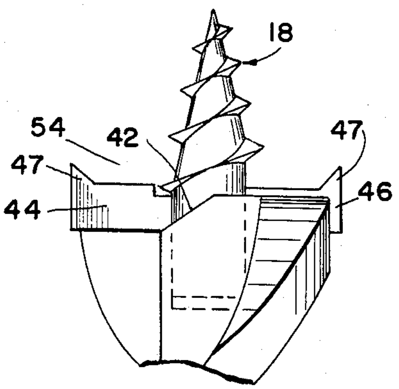
FIG. 10
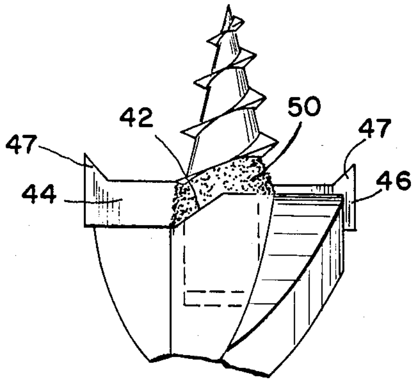
FIG. 11
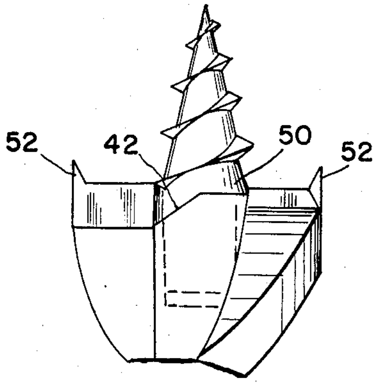
FIG. 12
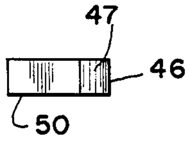
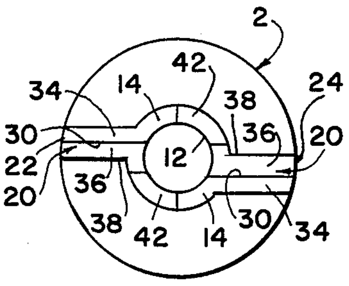
FIG. 6

WOOD DRILL AND METHOD OF CONSTRUCTION

TECHNICAL FIELD

This invention relates to drills and their construction, and particularly to drills especially adapted for wood.

BACKGROUND ART

Drills are well known in the art and in their construction many materials have been used for the body, including the web, spiral lands, and holding shank; with cutters, or inserts, being made of a material having improved properties to provide a cutting part having a longer life.

Many steel alloys have been used for the main drill body, while carbides, for example, have been used for the cutter, or insert. Materials used for a drill body and cutters are set forth in the following patents: (1) U.S. Pat. No. Re. 19, 182; (2) U.S. Pat. No. 1,887,374; (3) U.S. Pat. No. 4,008,976; (4) U.S. Pat. No. 4,143,723; (5) U.S. Pat. No, 4,134,616; and (6) U.S. Pat. No. 4,356,873.

While inserts of a different material from the body of the drill have been used to present a harder cutting edge, none of the prior art patents discloses applicant's drill construction.

DISCLOSURE OF INVENTION

The present invention provides a new and improved wood drill and method of construction.

One object of the present invention is to provide a drill formed having a first and second spiral land extending from the top downwardly along an elongated web, the top of the web and the top of the first and second spiral lands are formed as a flat surface substantially perpendicular to the axis of the web, the flat top of the web has an axial hole formed therein, said axial hole forming a web wall between said lands, a notch is formed in the flat top of each spiral land extending from the outer end of the land to the hole in the web where it has a desired width through the web, each notch having a first surface facing forwardly in the direction of rotation of the drill, the location of said first surface leaving a thickness of the flat top of each land which meets with the thickness of the web wall, each notch having a second surface extending forwardly from the bottom of said first surface forming an upwardly facing platform, a portion of the web wall is removed in the direction of rotation of the drill starting at the forward edge of the desired width of the notch from the first surface, a lead screw has a bottom axial projection fitting into the axial hole in the flat top of the web. A carbide cutting insert is placed in each notch with one side against the first surface of each notch, its bottom against the second surface of each notch, and its inner end against said lead screw; the lead screw and carbide inserts being brazed in place on the drill with braze material filling the portion of the web wall removed. The inserts are contoured, such as by grinding, with lands to provide a proper cutting surface.

Another object of the present invention is to provide a drill wherein the lead screw and the carbide cutting inserts can be removed and replaced when necessary. This facilitates the repair of a drill if the lead screw is damaged or broken off or the cutting inserts need replacing in view of exceptional wear or other damage. This capability permits an economical repair of the drill.

A further object of this invention is to provide a wood drill with improved cutting ability and which will retain its sharpness longer by using carbide.

Another object of this invention is to provide a wood bit which self-feeds, or draws itself, into a hole it is forming with minimum force being applied by the operator.

A further object of the invention is to provide a wood drill with an improved chip removal capability. A groove is provided on the spiral under surface of the land located radially inwardly from the outer end of the land.

BRIEF DESCRIPTION OF THE DRAWINGS

FIG. 1 is a side elevational view of a drill body having the lands formed thereon along with a holding shank;

FIG. 2 is a top view of FIG. 1 showing the flat top end of the web and the two flat top ends of the spiral lands, said top ends of the spiral lands showing straight sides for forming the upper and lower spiral land surfaces;

FIG. 3 is an enlarged view of FIG. 2 showing an axial hole in the flat top of the web;

FIG. 4 is a view of FIG. 3 showing a notch formed in the flat top of each land and web into said axial hole;

FIG. 5 is an enlarged view of the upper part of FIG. 1 showing it ready to receive the lead screw and the two inserts;

FIG. 6 is a top view of FIG. 5;

FIG. 7 is a left side view of FIG. 5;

FIG. 8 is a view of the upper part of FIG. 5 showing the lead screw and two inserts in an exploded position;

FIG. 9 is a view similar to FIG. 8 showing the lead screw in place along with the two inserts;

FIG. 10 is a view similar to FIG. 9 showing the lead screw and two inserts brazed in position;

FIG. 11 is a view showing the inserts and lands contoured to form the cutting diameter and edges of the drill;

FIG. 12 is a view showing the top of the insert on the right in FIG. 8;

FIG. 13 is an enlarged view similar to FIG. 3 showing an axial hole in the flat top of the web wherein the lands have contoured sides forming a reduced section located radially inwardly from the outer end of the land; and FIG. 14 is a view of FIG. 13 showing a notch formed in the flat top of each land and web into said axial hole.

BEST MODE FOR CARRYING OUT THE INVENTION

Referring to the drawings, FIG. 1 shows a drill body 2 at a step in the manufacture of a drill having a web 4 with spiral lands 6 and 8 and a holding shank 10. The top of the drill body 2 in FIG. 1, including the web 4 and lands 6 and 8, is formed flat and substantially perpendicular to the axis of the web 4. Spiral land 8 forms approximately a half a sprial turn around the web while spiral land 6 extends for at least a little longer down the web than the hole expected to be drilled. The holding shank 10 may be one of many constructions well adapted to be releasably clamped in the holding device of a suitable driving unit known in the art, and does not form part of the invention.

The web 4 is drilled in the flat top to form a hole 12 along the axis of the web 4 (see FIG. 3). The hole 12 forms a web wall 14 between the two lands 6 and 8 where they connect to the web. The hole 12 is sized to receive the bottom axial projection 16 of a separate lead screw 18, to be hereinafter discussed (see FIG. 8).

A notch 20 is formed in the flat top of each land 6 and 8, one notch 20 extending from the outer end 22 of the land 6 through the web 4 to the hole 12 and one notch 20 extends from the outer end 24 of the land 8 through the web 4 to the hole 12. The notch 20 has a desired width formed through the web, for a purpose to be hereinafter described. Each notch 20 has a first surface 30 facing forwardly in the direction of rotation of the drill, the forwardly facing first surface 30 leaving a portion 32 of the top of each land 6 and 8, said portion 32 having a flat top surface 34 which meets with the top surface of the web wall 14. Each notch 20 has a second surface 36 extending forwardly from the bottom of the first surface 30 to a forward edge 38.

A portion of the web wall 14 is removed in the direction of rotation of the drill starting at the forward edge of the width of the notch 20 formed through the web wall 14. This portion is removed to receive braze material in a later described method of construction. The portion removed may be in many shapes, but is shown in FIGS. 5, 6 and 7 as a curved triangular portion leaving a curved slanted surface 42.

As referred to above, a separate lead screw 18 is formed having a threaded section 19 and a bottom axial projection 16 which is sized to properly fit into the hole 12 for being held therein.

Carbide cutting inserts 44 and 46 are provided to fit into the notches 20 formed in the flat top of each land 6 and 8, respectively. The top of the end of each carbide insert 44 and 46 to be positioned at the outer end 22 or 24 of the lands has an upwardly extending projecton 47 which tapers outwardly and upwardly from a point approximately one-fourth of the length of the carbide insert from its outer end. Each carbide cutting insert is placed in its notch 20 with its bottom surface 48 positioned on the second surface 36 of its cooperating notch 20, and to back side 50 of each insert is placed against the cooperating first surface 30. The carbide inserts 44 and 46 are positioned radially inwardly in their respective notches 20 so that the inner ends become positioned adjacent the bottom axial projection 16 of the lead screw 18. If the thread of the threaded section 19 of the lead screw 18 interferes with the positioning of the end of the carbide insert so that it cannot be placed close enough to the axial projection 16 for proper brazing, the upper inner corner of the carbide insert can be notched as at 54. The upwardly extending projections 47 are positioned at the outer end of the lands 6 and 8, each projection 47 being above the top of its cooperating land and extending radially outwardly from the outer end of its cooperating land.

The lead screw 18 and carbide cutting inserts 44 and 46 are brazed into position using brazing material 50. The brazing material forms a holding action between the bottom axial projection 16 and the hole 12 in the web 4 and between the carbide cutting inserts 44 and 46 and the respective lands 6 and 8 into which they are positioned. The brazing material enters the area where the portion of the web wall 14 is removed to provide an additional brazing of the lead screw 18 and carbide cutting inserts 44 and 46 to the web 4 and to each other (see FIG. 10).

After the lead screw 18 and carbide cutting inserts 44 and 46 have been brazed in place, the end of the drill is ground to provide the proper diameter for the drill by forming the drill cutting tips 52 from the projections 47 of the carbide inserts and to provide the proper cutting surfaces on the carbide cutting inserts 44 and 46 and blend them into the lands 6 and 8, respectively. The brazing material is smoothed at any other point to prevent its interference with the action of the drill (see FIG. 11).

While the preceding description refers to Figures showing the lands having straight sides forming a flat spiral, a drill body 2 can be formed as set forth in FIGS. 13 and 14 with the lands 6A and 8A having one or more contoured sides with a reduced section located radially inwardly from the outer end of the land, the contour extending for the length of the spiral land necessary to form the desired depth hole.

As viewed in FIGS. 13 and 14, the upper surface of each land 6A to 8A has a spiral raised outer end 60 extending for the desired length from the top of the body; and the under surface of each land 6A and 8A has a spiral raised outer end 62 with a deep spiral trough, or groove, 64, also extending for the desired length, said spiral trough providing an improved chip removal capability. A notch 20A is formed in the flat top of each land 6A and 8A, each notch 20A extending from the outer end of its respective land 6A and 8A through the web 4A to the hole 12A. In this construction, the second surface 36A,extending from the bottom of the forwardly facing first surface 30A, is formed having a contoured forward edge 38A. This contoured forward edge 38A has a contour including the raised outer end 62 and groove 64.

In constructing the drill body 2, while the notches 20 and 20A can be formed many ways, one way is to run a cutter of a milling machine along the top of a land from the outer end of the top of a land to the hole 12 or 12A. If the drill body 2 has diametrically opposed lands, the cutter can be run the entire length of the two lands in one operation. With wide symmetrical lands as shown in FIG. 4, this operation can leave an extraneous piece 70B of the land 6B or 8B connected to the web 4B. This piece 70B is merely removed by any known means, leaving the notch 20B, and the web 4B is then formed as desired for subsequent brazing.

In a given drill construction, changing the depth of the first surface 30 of the notch 20 will vary the forward projecting measurement of the second surface 36.

I claim:

1. A method of making a drill having a direction of rotation for drilling, (1) forming a web having a first spiral land extending for at least the length of a hole to be drilled, and a second spiral land extending midway down the groove formed by the first spiral land, said first and second spiral land having an upper and lower spiral surface, (2) forming the top of the web, first spiral land, and second spiral land as a flat portion with the top of the first spiral land and second spiral land each extending outwardly from the web to an outer end, (3) forming a hole into the top end of the web, (4) forming a first notch in the top of the first spiral land extending from the outer end to the hole in the web, said first notch having a first surface facing in the direction of rotation of the drill and a second surface extending from the bottom of said first surface in the direction of rotation of the drill forming a platform, (5) forming a second notch in the top of the second spiral land extending from the outer end to the hole in the web, said second notch having a first surface facing in the direction of rotation of the drill and a second surface extending from the bottom of said first surface in the direction of rotation of the drill forming a platform, (6) forming a lead screw having a bottom axial projection for fitting into the hole in the top end of the web, (7) forming a cutting insert for placement in each first and second notch against the first and second surfaces, respectively, (8) placing the bottom axial projection of said lead screw into the hole, (9) placing a cutting insert respectively in each first and second notch against the first and second surfaces, respectively, and adjacent the bottom axial projection of said lead screw,

(10) fixing said lead screw and inserts to each other and to said web and lands;

(11) contouring the inserts and adjacent spiral lands to provide a sharp forward edge for cutting, and

(12) forming a holding shank at the bottom of the web.

2. A method as set forth in claim 1 wherein Step (11) includes contouring each of said inserts with a projecting cutting tip at its outer end in line with the outer end of its cooperating spiral land.

3. A method as set forth in claim 1 wherein Step (1) includes forming a deep spiral groove in the lower spiral surface of said first and second spiral land adjacent the web and forming a spiral raised end in the lower spiral surface of said first and second spiral land adjacent the outer end of the land.

4. A method as set forth in claim 1 wherein in Step (10), said lead screw and inserts are brazed to said web and lands.

5. A method a set forth in claim 3 wherein in Steps (4) and (5) said upwardly facing platforms have a forward edge having the contour of the lower spiral surface.

6. A method as set forth in claim 1 wherein in Step (2) said top of the first spiral land and the top of the second spiral land are diametrically opposed, Steps (4) and (5) include forming said first and second notches by placing a diametrical cut through the top of the first spiral land, top of the web, and the top of the second spiral land.

7. A method as set forth in claim 1 wherein in Step (7) each cutting insert is formed having an upwardly extending projection at one end, Step (9) includes placing each upwardly extending projection at the outer end of its respective notch, Step (11) includes contouring each of said upwardly extending projections of each of said inserts with a projecting cutting tip at its outer end in line with the outer end of its cooperating sprial land.

* * * * *